United States Patent [19]

Lill

[11] 4,147,398
[45] Apr. 3, 1979

[54] SELECTIVE ELECTRICAL CONNECTIONS AMONG WIRES OF DIFFERENT DIAMETERS

[75] Inventor: John F. Lill, Harrisburg, Pa.

[73] Assignee: AMP Incorporated, Harrisburg, Pa.

[21] Appl. No.: 887,585

[22] Filed: Mar. 17, 1978

[51] Int. Cl.² .......................... H01R 9/08; H02K 3/50
[52] U.S. Cl. ...................................... 339/98; 310/71; 310/184
[58] Field of Search ......................... 339/95 D, 97–99; 310/71, 184–188, 198

[56] References Cited

U.S. PATENT DOCUMENTS

| 2,802,958 | 8/1957 | Curley | 310/71 |
| 3,457,442 | 7/1969 | Charlton et al. | 310/71 |
| 3,869,190 | 3/1975 | Bazille, Jr. | 339/98 |
| 3,979,615 | 9/1976 | Neff | 310/71 |

Primary Examiner—Neil Abrams
Attorney, Agent, or Firm—Frederick W. Raring

[57] ABSTRACT

The electrical connections to the main winding and the auxiliary winding of an induction motor are made with three identical terminals, each of which has one wire-receiving slot means dimensioned to receive the wire of the main winding and another wire-receiving slot means which is dimensioned to receive the wire of the auxiliary winding. A terminal housing is used which has three cavities, one for each of the terminals. The housing has a wire-admitting slot means communicating with the first cavity which receives only one end of the main winding, a wire-admitting slot means which communicates with the second cavity and which receives only one end of the auxiliary winding. Two wire-admitting slots communicate with the third cavity and these slots receive the other ends of the main and auxiliary windings. Three identical terminals are crimped to lead wires so that when the terminals are inserted into the cavities, the required electrical connections will be made to the main and auxiliary windings of the motor.

6 Claims, 6 Drawing Figures

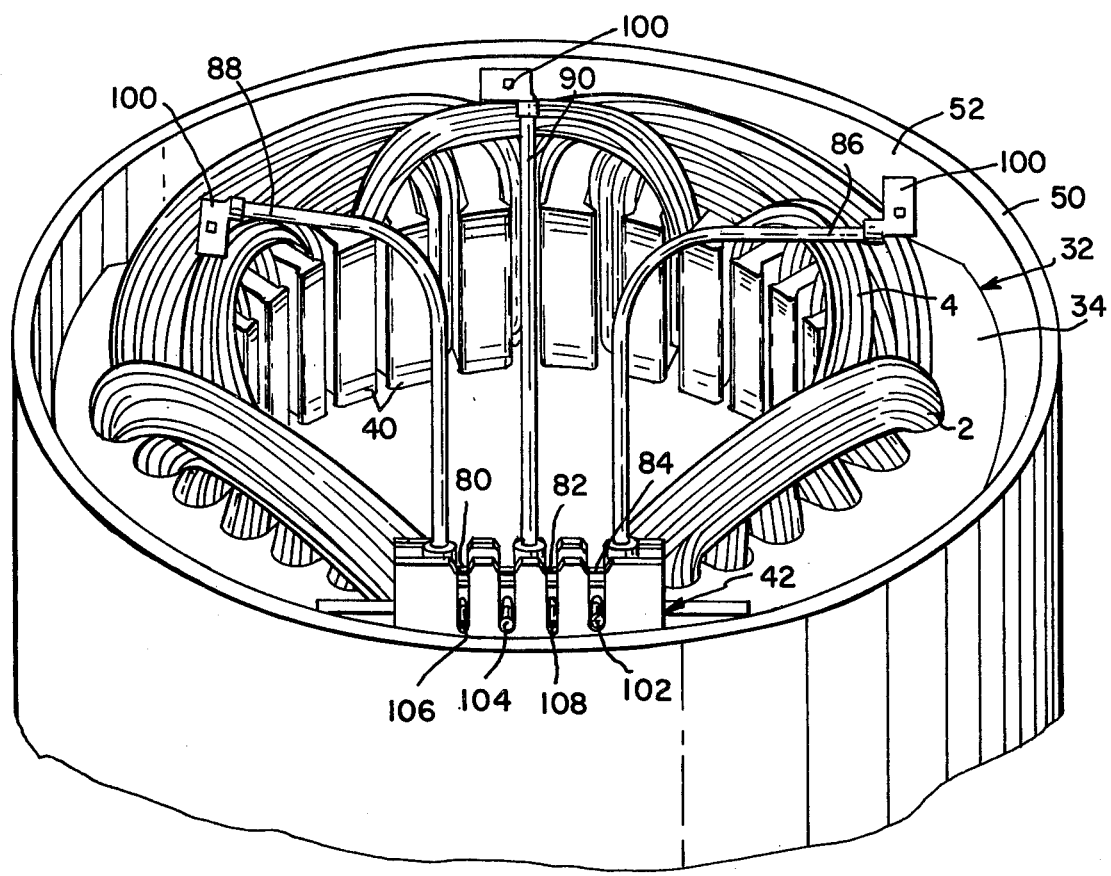
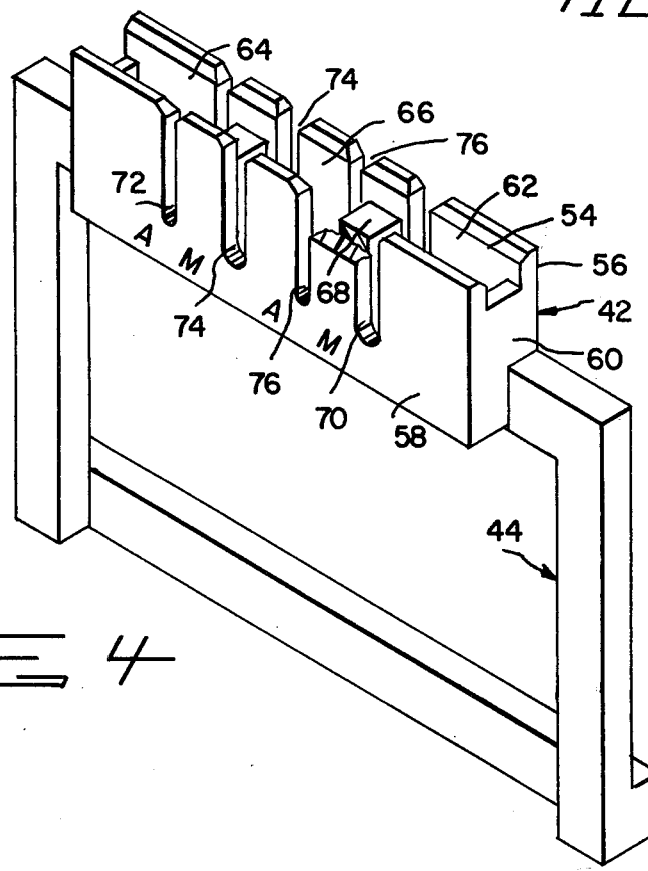

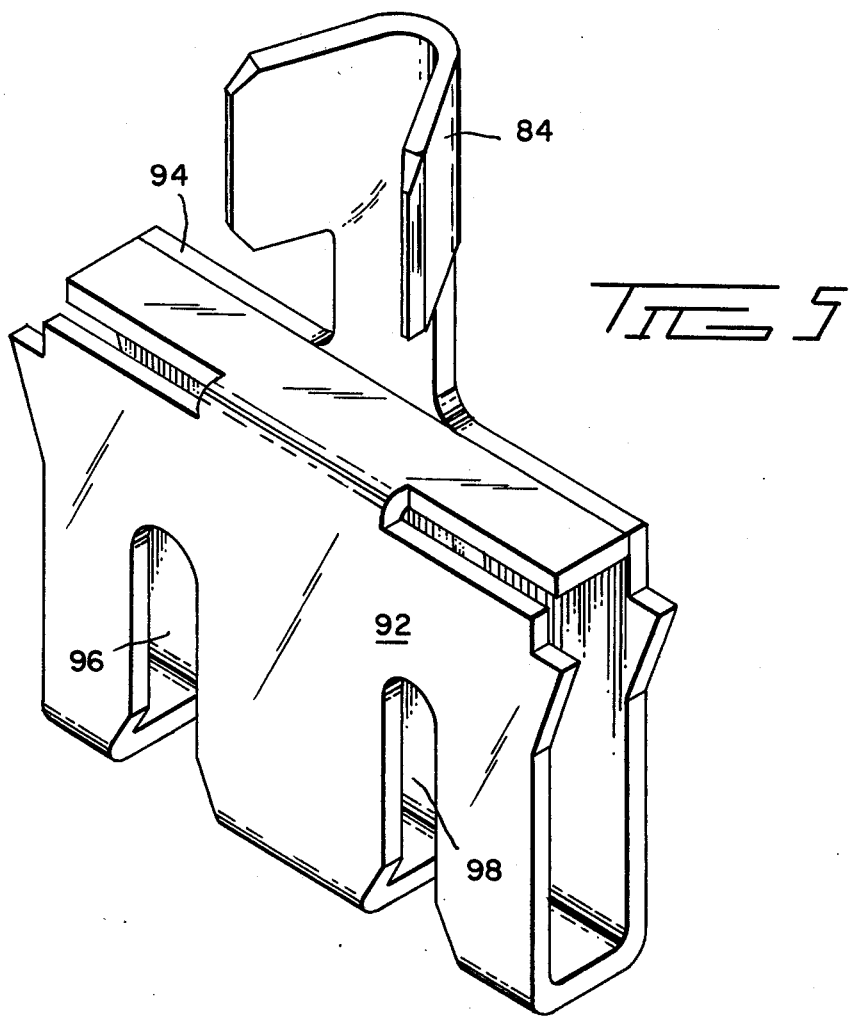
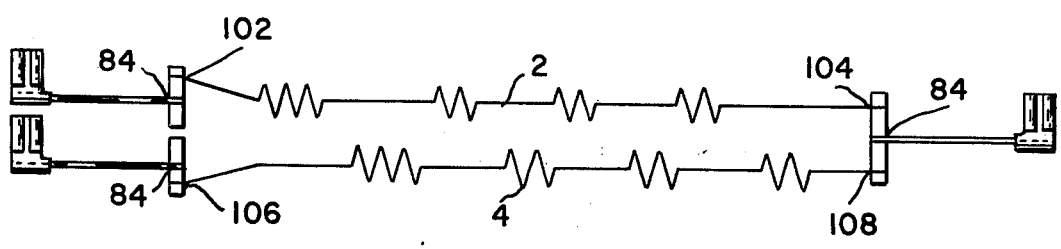

SELECTIVE ELECTRICAL CONNECTIONS AMONG WIRES OF DIFFERENT DIAMETERS

BACKGROUND OF THE INVENTION

This invention relates to electrical connections to induction motors or the like which have two separate windings thereon, one of the windings being composed of a more coarse wire than the other winding. The specific embodiment of the invention described below is particularly adapted for a single phase induction motor but other uses for the invention may be apparent to those skilled in the electric motor manufacturing arts.

It is common practice, as shown in U.S. Pat. Nos. 3,793,611, 3,979,615 and in application Ser. No. 849,049 filed Nov. 7, 1977, to form electrical connections with coil wires by means of electrical terminals which have wire-receiving slots therein dimensioned to receive, and establish electrical contact with, the coil wire. Coil windings are usually insulated with a varnish-type film of insulating material such as polyvinyl formal resin and when the wire is moved relatively into the slot of the terminal, the edges of the slot penetrate the insulation of the wire and establish electrical contact with the conducting core of the wire. Terminals of this wire-in-slot type which are used to establish contact with electrical coils are usually provided with an additional contact means which can be connected to lead wires extending from the coil. This wire-in-slot terminating technique for electrical coils has been widely adopted for induction coils and for many types of electrical motors such as universal motors.

For several reasons, wire-in-slot type connections have not heretofore been used for induction motors. The windings of a typical single phase induction motor are comprised of a main winding which is usually of a relatively coarse gage wire and an auxiliary winding of a relatively finer gage wire. The circuitry normally requires that one end of each winding be connected to a common lead wire and the remaining ends be connected to separate lead wires. The disparity in diameters of the main and auxiliary windings presents termination problems which have discouraged the use of wire-in-slot terminations in the past. The use of this wire-in-slot technique has also been discouraged by reason of certain physical and dimensional limitations and requirements as explained in my co-pending application Ser. No. 887,584.

The instant invention is specifically directed to the achievement of improved terminating techniques for the windings of induction motors and particularly to the achievement of wire-in-slot terminations in an efficient and orderly manner for such motors. In accordance with the principles of the invention, three identical terminals are employed, each terminal having a first slot means which is dimensioned to receive the wire of the main winding and a second slot means which is dimensioned to receive the wire of the auxiliary winding. These terminals are used in conjunction with a terminal housing having three terminal-receiving cavities therein. Wire-admitting slots are provided in the housing which permit one end of the main winding to be located in the first cavity, one end of the auxiliary winding to be located in the second cavity, and the remaining ends of both windings located in the third cavity. When the terminals are inserted into the cavities, electrical connections are established with the ends of the coil windings as required by the control circuit of the induction motor.

It is accordingly an object of the invention to provide an improved terminating means for the windings of an induction motor. A further object is to provide connecting means for establishing predetermined electrical connections between lead wires and coil wires of different diameters. A further object is to simplify and improve the manufacturing techniques for induction motor stators.

These and other objects of the invention are achieved in a preferred embodiment thereof which is briefly described in the foregoing abstract, which is described in detail below, and which is shown in the accompanying drawing in which:

FIG. 3 is a view similar to FIG. 2, but showing the stator and the motor housing assembled to each other.

FIG. 4 is a perspective view of a terminal housing having integral mounting means which is used in the practice of the invention.

FIG. 5 is a view of a terminal in accordance with the invention.

FIG. 6 is a semi-diagrammatic view illustrating the manner in which the coil windings and the lead wires are connected to the terminals.

Figure 1:
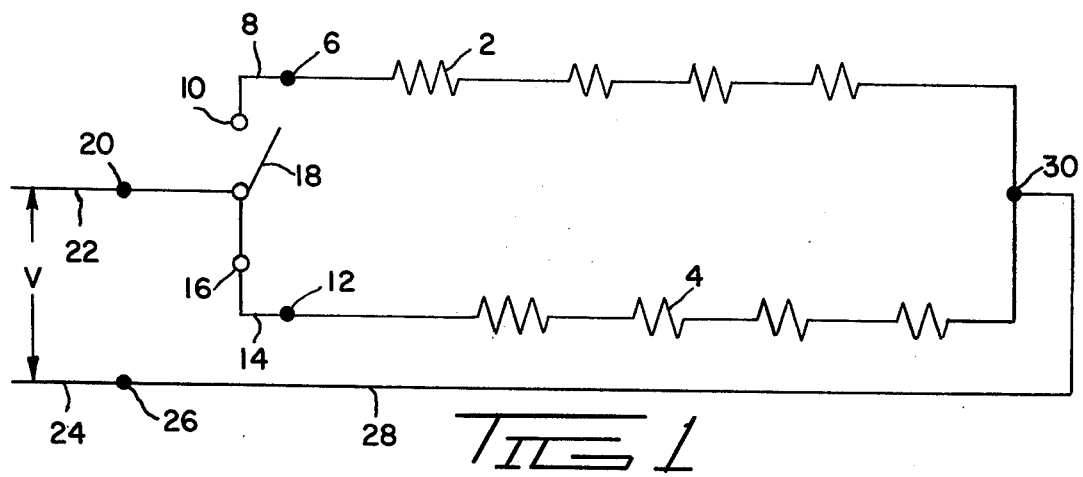
FIG. 1 is a simplified circuit diagram for a typical single phase induction motor.

Referring first to FIG. 1, a typical induction motor has a main winding 2 and an auxiliary winding 4, the main winding usually being of a relatively coarse gage wire and the auxiliary winding being of a relatively finer gage wire. In this embodiment auxiliary winding is energized only when the motor is started and the main winding is energized during continuous normal running of the motor. The main winding is connected at 6 to a conductor 8 which extends from one pole 10 of a switch and the auxiliary winding 4 is connected at 12 to the conductor 14 which extends from the other pole 16 of the switch. The switch has a movable contact arm 18 which is connected at 20 to one service conductor 22 and the other service conductor 24 is connected at 26 to a conductor 28 which extends to a junction 30. The remaining ends of the windings 2, 4 are commonly connected at this junction 30 so that either one of the two windings 2, 4 will be energized depending upon the position of the switch arm 18. The switch may be of a centrifugal type which changes its condition when the motor reaches a predetermined speed.

Figure 2:
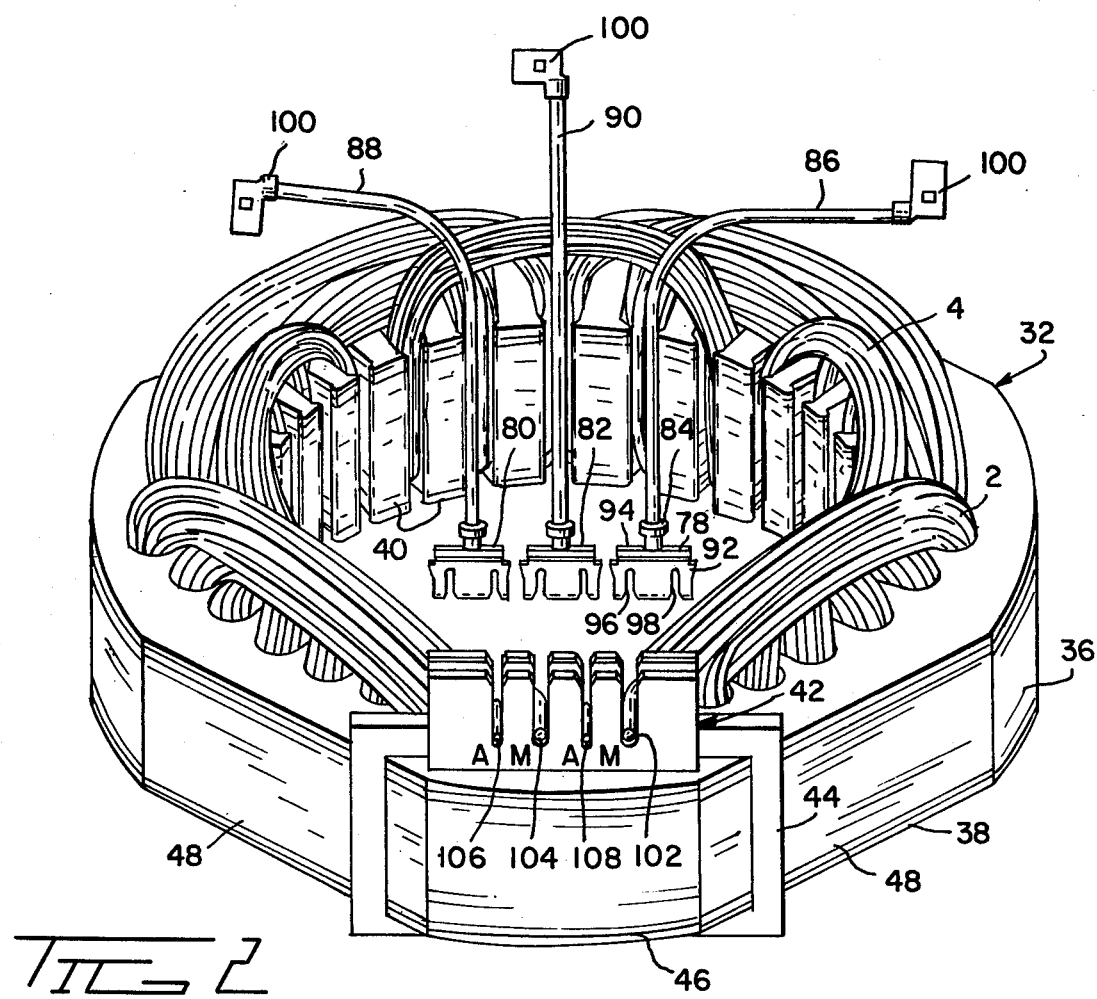
FIG. 2 is a perspective view showing an induction motor stator and terminating means for the coil windings in accordance with the invention, the terminals being exploded from the terminal housing.

Turning now to FIGS. 2–4, a typical stator 32 for an induction motor comprises a stack of identical laminae having a central opening, an upper face 34, a circumferential surface 36 and a lower face 38. Spaced apart teeth 40 extend inwardly towards the center of the stator and the main and auxiliary windings 2, 4 extend between selected teeth to define the poles of the motor as shown in FIG. 2. A terminal housing 42 is mounted on the face 34 by means of an open rectangular frame 44 through which an arcuate portion 46 of the surface 36 extends. The sides of this frame extend across flat portions 48 of surface 36 which are on each side of the arcuate section 46. When the stator is inserted into the cylindrical motor housing 50, these arcuate surfaces 46 are against the internal surface 52 of the motor housing 50 and the terminal housing is thereby captured on the stator. The mounting means 44 for the housing is more fully described in my co-pending application Ser. No. 887,584 filed Mar. 17, 1978.

The housing 42 has an upwardly facing, as viewed in FIG. 4, terminal-receiving face 54 and parallel sidewalls 56, 58 and endwalls 60 which surround this face. First, second, and third terminal-receiving cavities 62, 64 and 66 respectively extend into the terminal-receiving face and are dimensioned to receive terminals 78, 80 and 82 described below. In the disclosed embodiment, the third cavity 66 is between the first and second cavities and is separated from the outside cavities by internal barrier walls 68. A first wire-admitting slot means 70 is provided in the sidewalls 56, 58 and opens into the first cavity 62, this first slot means being dimensioned to receive the relatively coarse gage wire of the main winding 2. A second wire-admitting slot means 72 in the sidewalls opens into the second cavity 64 and is dimensioned to receive the wire of the auxiliary winding 4 and refuse admittance to the wire of winding 2. Third slot means comprising two slots 74 and slots 76 in the sidewalls which open into the third cavity 66, the wire-admitting slots 74 being dimensioned to receive the coarse gage main winding wire and the wire-admitting slots 76 being dimensioned to receive only the finer gage auxiliary winding wire. It will be apparent from FIG. 4 that the end portions of the wires can be positioned in the wire-admitting slots in the housing and that the wires will then extend transversely across the cavities. Advantageously, indicia are provided on the sidewalls 58 to identify the slots and indicate which wire they are dimensioned to receive.

The electrical connections to the end portions of the coil wires are made by first, second, and third terminals which are intended to enter the first, second, and third cavities respectively. The terminals are identical so that a description of one will suffice for all. Each terminal thus comprises a pair of spaced-apart plate-like members 92, 94 connected by a bight or web. First and second wire-receiving slots 96, 98 extend into the plate-like members and through the web as shown, the first slot 96 being dimensioned to receive, and establish electrical contact with, the wire of the main winding 2 and the slot means 98 being dimensioned to receive, and establish electrical contact with, the wire of the auxiliary 4. The first, second, and third terminals are connected by crimped connections 84 to first, second, and third lead wires, 86, 88, 90 respectively, which have flag-type quick disconnect terminals 100 on their ends.

In use, the electrical connections between the lead wires and the ends of the coil wires are made by placing one end 102 of the coil winding 2 in the wire-admitting slot 70, one end 106 of the coil winding 4 in the slot 72 of the housing and placing the remaining ends 104, 108 in the wire-admitting slots 74, 76 respectively. Thereafter, the terminals 78, 80, 82 are inserted into the cavities and as the terminals enter the cavities, the wires will be received in the appropriate wire-receiving slots of the terminals and contact with the wires in accordance with the circuit diagram of FIG. 1 will be established.

The three lead wires 86, 88, 90 may be identical although under some circumstances one may be somewhat longer than the others. The proper connections betwen the lead wires and the coil wires will be established as the terminals enter the cavities.

Advantageously, the identical cavities 62, 64, 66 and the identical terminals 78, 80, 82 are keyed to each other in a manner such that the terminals can be inserted into the cavities in only orientation. Thus, the embodiment disclosed, the plate members 94 are against the rearward walls of the cavities as viewed in FIG. 2. It follows that the slot means 96 of each terminal is on the left, and slot means 98 is on the right. Therefore, the end 106 of the coil wire 4 will be received in the relatively narrow slot 98 of the terminal 80 by virtue of the location of the wire-admitting slot 72. Similarly, the end 102 of the coil wire 2 will be received in the slot 96 of the terminal 78 and the remaining ends 104, 108 of the coil windings will be received in the appropriate slots of the terminal 82. The selective electrical connections are thus achieved by virtue of the locations of the wire-admitting slots in the housing and the fact that the terminals are in a predetermined orientation when they are inserted into the cavities. The terminals and the housing can be constructed with appropriate shoulders or other stops which will ensure insertion of the terminals into the housing in only one orientation.

In the foregoing description, the third cavity is located between the first and second cavities in the housing, an arrangement which may provide maximum symmetry and which may be convenient under many circumstances. However, the cavities can be otherwise arranged if desired and in fact, the three cavities might be provided in two or three housings at separate locations on the stator.

A salient advantage of the invention is that the connections are made to wires of two different gages by means of a single type of terminal and the arrangement of the wire-admitting slots in the housing ensures that the ends of the proper coil wire, main or auxiliary, will be correctly located in the housing during the manufacturing process.

What is claimed is:

1. Electrical connecting means for connecting a first electrical lead to one end of a first wire, for connecting a second electrical lead to one end of a second wire and for commonly connecting the other ends of said first and second wires to a third electrical lead, said wire being of a relatively coarse gage, said second wire being of a relatively finer gage than said first wire, said connecting means comprising:

insulating housing means having first, second, and third terminal-receiving cavities therein, a first wire-admitting slot means in said housing communicating with said first cavity, a second wire-admitting slot means in said housing communicating with said second cavity, and third wire-admitting slot means communicating with said third cavity, said third wire-admitting slot means comprising two side-by-side slot means, said first and second wire-admitting slot means each comprising a single wire-admitting slot means adapted to receive a single wire, first, second and third terminals, each of said terminals comprising a plate-like section having first and second side-by-side wire-receiving slots extending therein from one end thereof, said first slot being dimensioned to receive, and establish electrical contact with, said first wire, said second slot being dimensioned to receive, and establish electrical contact with, said second wire, said first wire-admitting slot means being dimensioned to admit said first wire, said second wire-admitting slot means being dimensioned to admit said second wire and to refuse admittance to said first wire, one of said slot means of said third wire-admitting slot means being dimensioned to admit said first wire and the other slot means being dimensioned to admit said second wire and to refuse admittance to said first wire whereby, upon locating said one end of said first wire in said first wire-admitting slot means, locating said one end of said second wire in said second wire-admitting slot means, locating the other ends of said first and second wires in said third wire-admitting slot means and thereafter inserting said first, second, and third terminals into said first, second and third cavities respectively, the ends of said wires will be connected to said terminals.

2. Electrical connecting means as set forth in claim 1, said connecting means on said first, second, and third terminals comprising crimped electrical connections.

3. Electrical connecting means as set forth in claim 1, said insulating housing means comprising a single housing member.

4. Electrical connecting means as set forth in claim 3, said cavities being arranged in a row in said housing member.

5. Electrical connecting means serving to connect a first electrical lead to one end of a first wire, to connect a second electrical lead to one end of a second wire and to commonly connect the other ends of said first and second wires to a third electrical lead, said first wire having a diameter which is greater than the diameter of said second wire, said connecting means comprising:

an insulating housing having a terminal-receiving face, first, second, and third terminal-receiving cavities extending into said terminal-receiving face, a first wire-admitting slot means in said housing communicating with said first cavity, a second wire-admitting slot means in said housing communicating with said second cavity, and third wire-admitting slot means communicating with said third cavity, said third wire-admitting slot means comprising two side-by-side wire-admitting slot means, said first and second wire-admitting slot means each comprising a single wire-admitting slot, first, second, and third identical terminals, each of said terminals comprising a plate-like section having first and second side-by-side wire-receiving slots extending therein from one end thereof, said first slot in each of said terminals being dimensioned to receive said first wire, said second slot in each of said terminals being dimensioned to receive said second wire, said second wire-admitting slot being dimensioned to admit said second wire and to refuse admittance to said first wire, one of said wire-admitting slots of said third wire-admitting slot means being dimensioned to admit said second wire and refuse admittance to said first wire, said one end of said first wire extending through said first wire-admitting slot means and into said first terminal-receiving cavity, said one end of said second wire extending through said second wire-admitting slot means and into said second cavity, said other ends of said first and second wires extending, through said third wire-admitting slot means and into said third cavity, said first, second, and third terminals being disposed in said first, second, and third cavities respectively with said wires disposed in said wire-receiving slots of said terminals, said first, second, and third electrical leads being electrically connected to said first, second, and third terminals respectively whereby, said ends of said wires are connected to said leads as set forth above.

6. Electrical connecting means as set forth in claim 5, said first wire comprising a main winding of an induction motor, said second wire comprising an auxiliary winding of an induction motor, said first wire being of a diameter which is greater than the diameter of said second wire.

* * * * *